(12) United States Patent
McBride

(10) Patent No.: US 7,976,093 B2
(45) Date of Patent: Jul. 12, 2011

(54) CANTILEVERED SEAT FOR A VEHICLE

(75) Inventor: Jeff McBride, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 12/536,674

(22) Filed: Aug. 6, 2009

(65) Prior Publication Data
US 2010/0156134 A1    Jun. 24, 2010

Related U.S. Application Data

(60) Provisional application No. 61/139,941, filed on Dec. 22, 2008.

(51) Int. Cl.
*B60N 2/02* (2006.01)

(52) U.S. Cl. ............... 296/65.05; 296/65.13; 296/65.14; 297/14; 297/15

(58) Field of Classification Search ............... 296/65.01, 296/65.06, 65.03, 64, 69, 65.09, 65.05, 65.13, 296/65.14; 297/378.13, 336, 312, 311, 344.15, 297/334, 335, 14, 15
See application file for complete search history.

(56) References Cited

U.S. PATENT DOCUMENTS

| | | | |
|---|---|---|---|
| 1,355,005 A | 10/1920 | Schechter | |
| 4,639,037 A | 1/1987 | Maruyama et al. | |
| 5,671,948 A | 9/1997 | Susko et al. | |
| 6,231,103 B1 | 5/2001 | Elson et al. | |
| 6,527,341 B1 | 3/2003 | Martin | |
| 6,647,916 B2 | 11/2003 | Neese et al. | |
| 6,817,660 B2 * | 11/2004 | Ito et al. | 297/15 |
| 6,846,044 B2 | 1/2005 | Moffa et al. | |
| 7,086,696 B2 | 8/2006 | Yudovich | |
| 7,195,302 B2 | 3/2007 | Jovicevic | |
| 7,293,835 B2 | 11/2007 | Yudovich | |
| 2004/0056521 A1 * | 3/2004 | Kayumi et al. | 297/334 |
| 2004/0130175 A1 * | 7/2004 | Mack et al. | 296/65.09 |
| 2006/0066123 A1 * | 3/2006 | Tsujibayashi et al. | 296/65.09 |
| 2006/0284464 A1 * | 12/2006 | Soditch et al. | 297/331 |
| 2007/0216185 A1 * | 9/2007 | McMillen | 296/64 |

* cited by examiner

*Primary Examiner* — Glenn Dayoan
*Assistant Examiner* — SunSurraye Westbrook
(74) *Attorney, Agent, or Firm* — Mark E. Duell, Esq.; Emerson Thomson Bennett

(57) ABSTRACT

A pivotal vehicle-based seat for use in a passenger compartment is disclosed. The rear seat assembly is supported by a seat support that is attached to the rear bulkhead at a first end and to the bottom of the seat base at the second end. The seat support enables the seat base to pivot from a use position to a to a compact storage position.

20 Claims, 6 Drawing Sheets

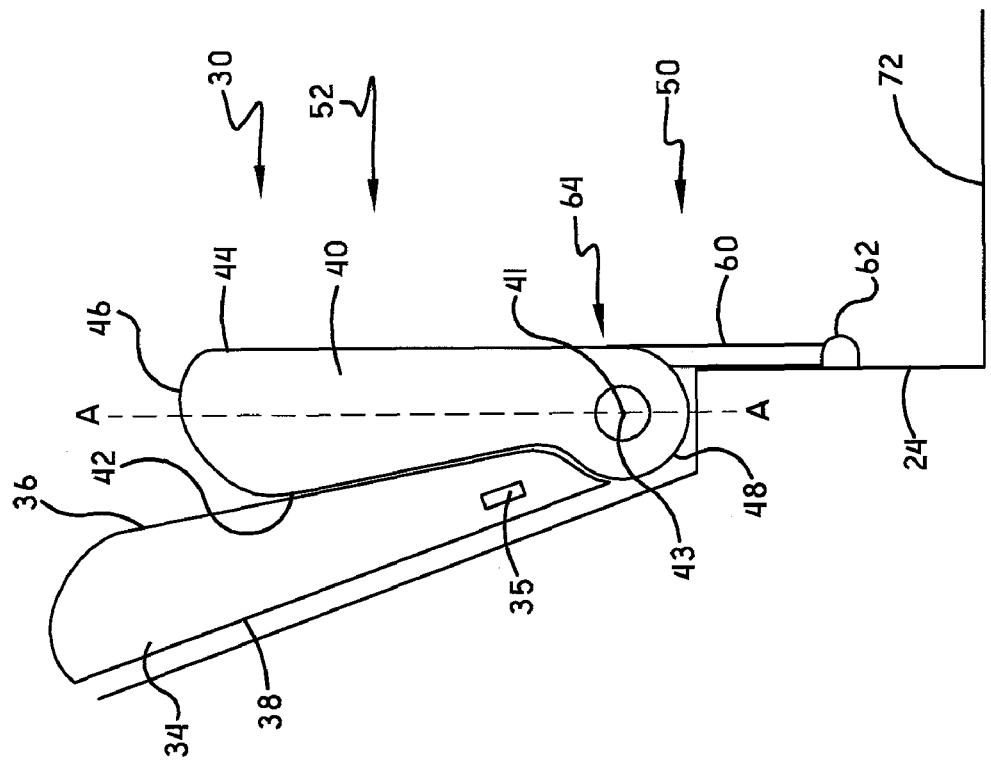
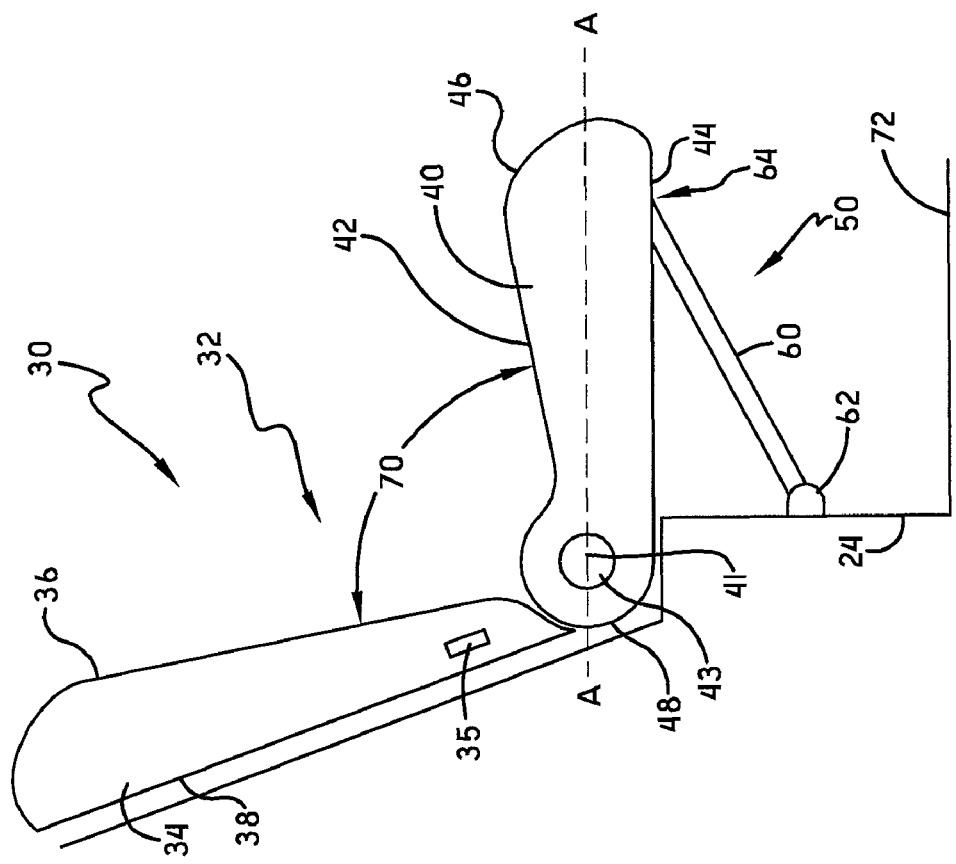

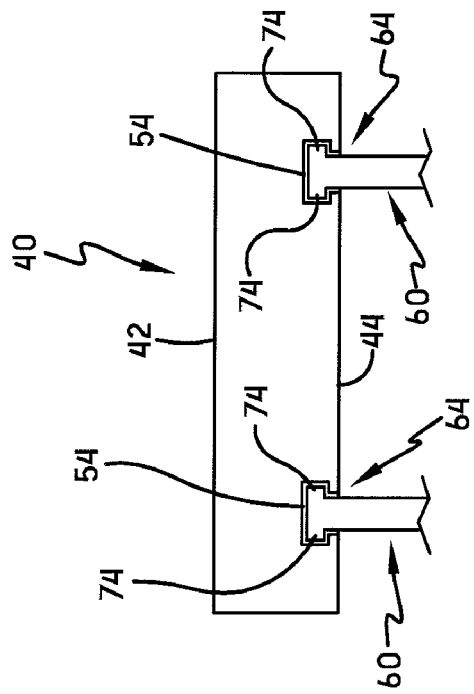
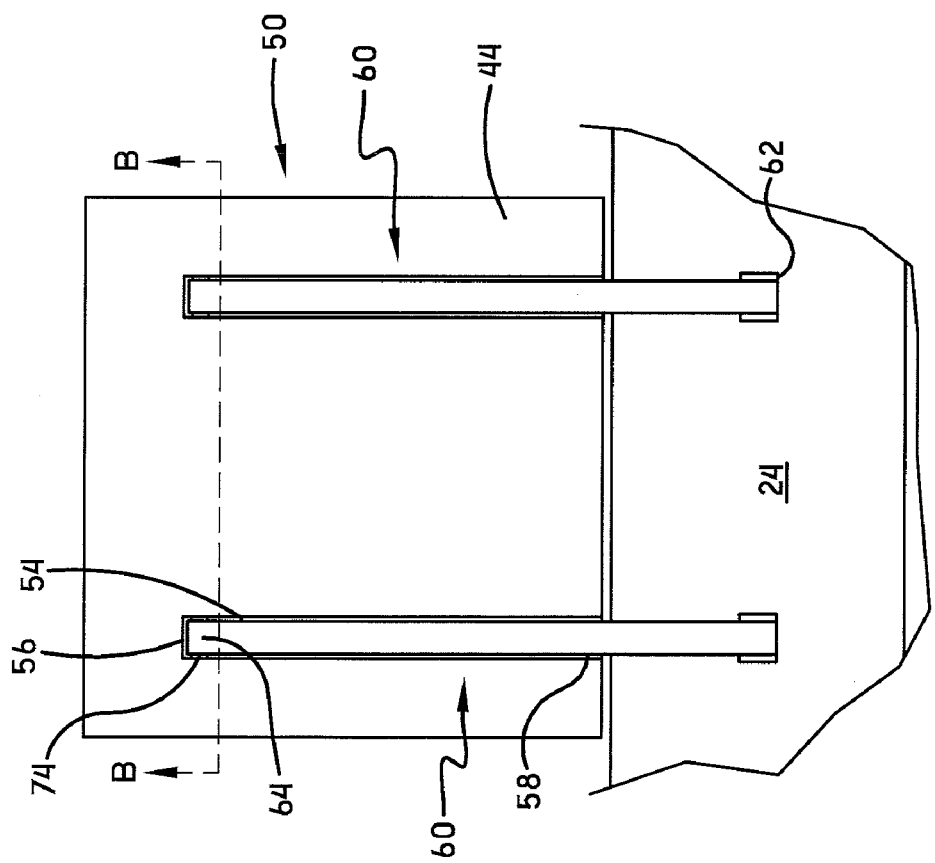

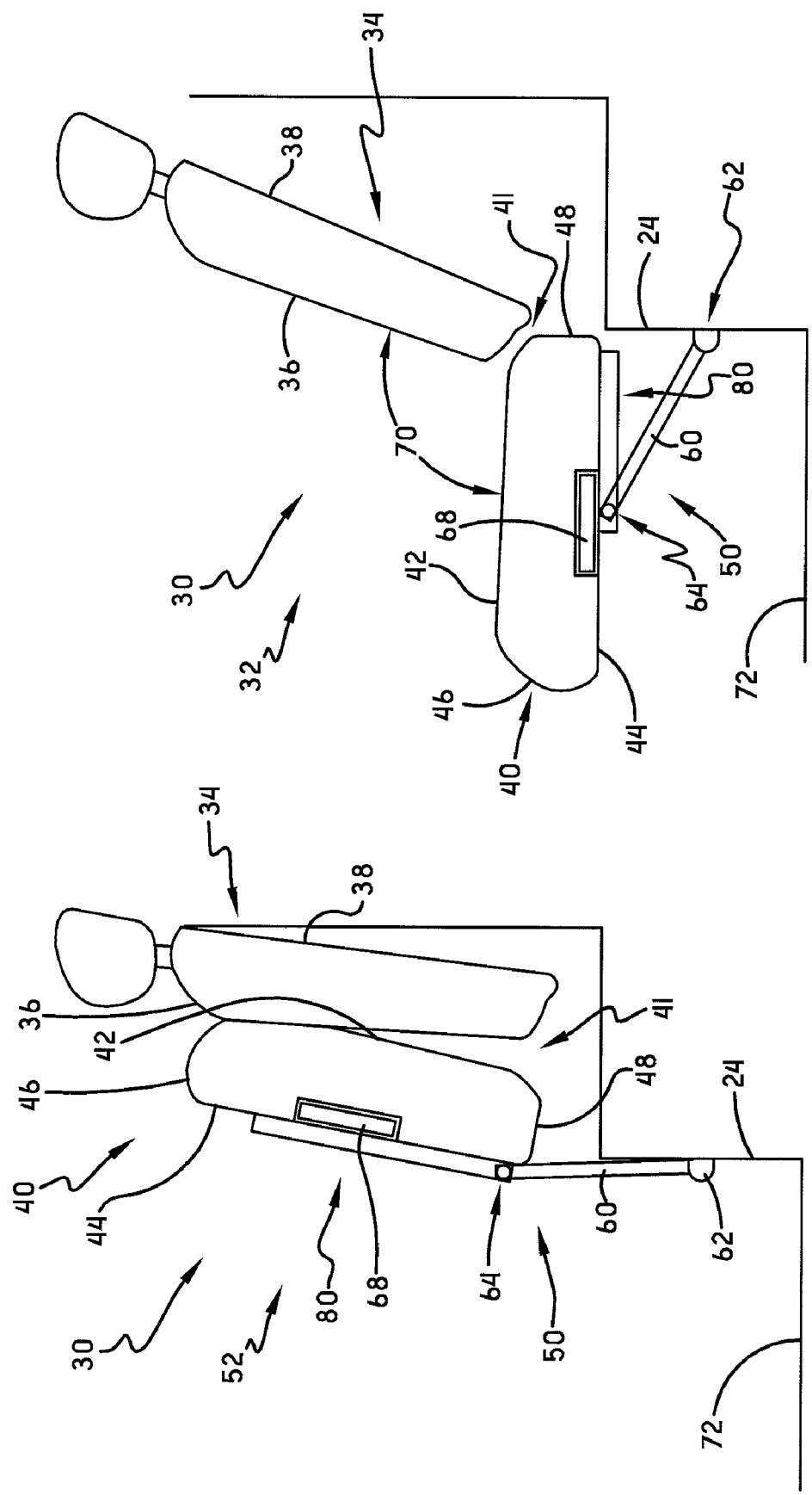

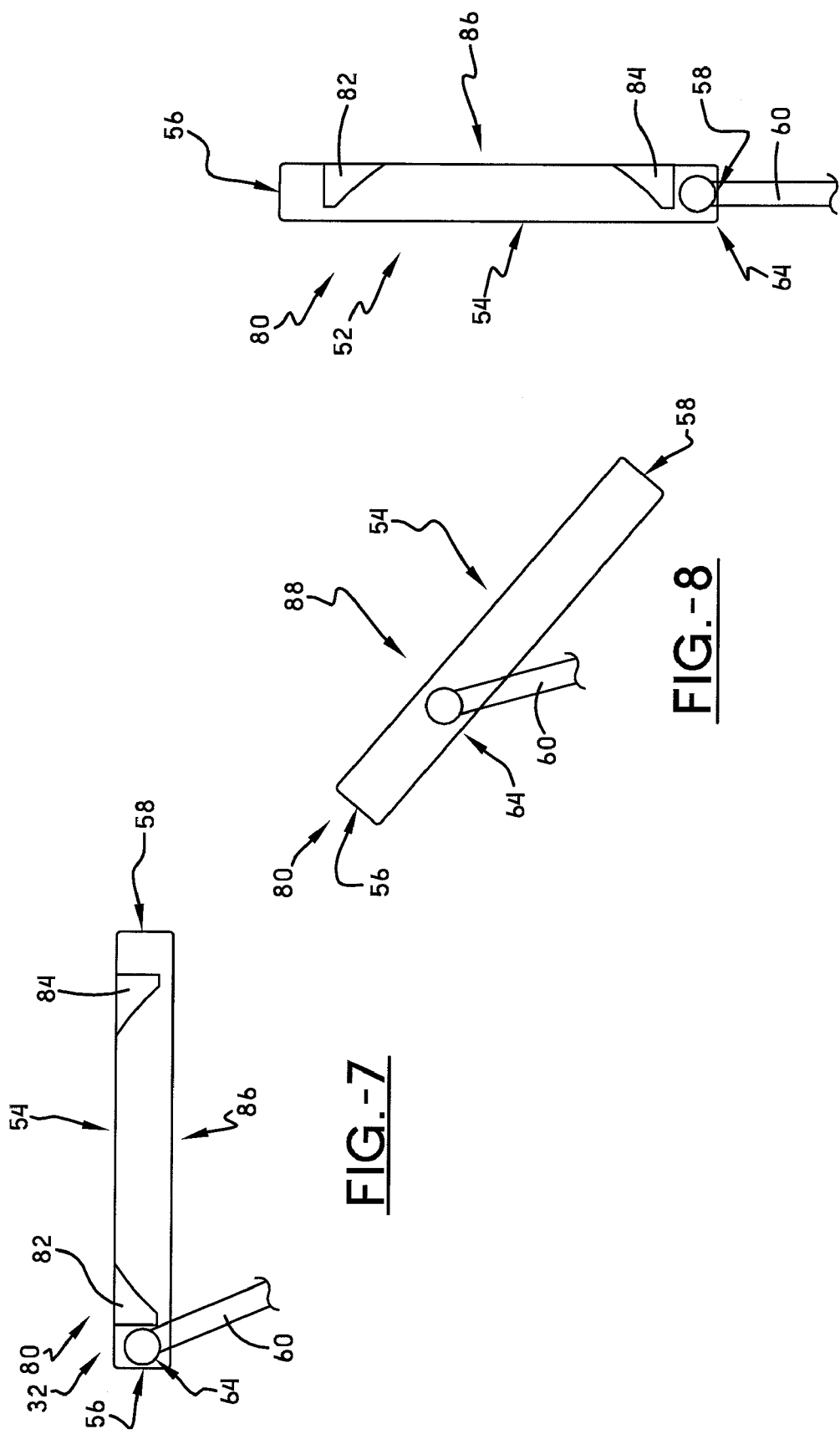

CANTILEVERED SEAT FOR A VEHICLE

This application claims priority to U.S. Ser. No. 61/139,941, entitled CANTILEVERED SEAT FOR A VEHICLE, filed Dec. 22, 2008, which is incorporated herein by reference.

I. BACKGROUND OF THE INVENTION

A. Field of Invention

This invention pertains to the art of methods and apparatuses regarding to occupant seating arrangements within a vehicle.

B. Description of the Related Art

In the automotive industry, the design of the passenger area or cabin is of great importance. Specifically, a great amount of time and effort goes into maximizing the amount of usable space within the vehicle cabin. Engineers and designers constantly struggle with how to create additional space within the interior. This task becomes even more difficult when dealing with truck-based vehicles, as this type of vehicle does not offer a large amount of interior space.

One modern development of truck-based automobiles is the rear row of seats that typically abut the rear wall or panel of the cabin interior. These seats take a relatively large amount of storage space. Most truck users rarely require the space for passengers and would like to use the space for storage when not occupied by a passenger.

Removing the rear seating assembly out of the truck is one way to maximize the interior storage space. This process tends to be time consuming and labor intensive. Another known solution is to use folding seats, where either the seat back rotates to meet the seat base or vice versa. There are many different ways to configure the way in which the rear seats fold while minimizing the space required to store the folded rear seats. However, folding seats require some form of support to the bottom portion of the seat. This bottom support requires that additional interior space be used that could otherwise be used for storage.

Therefore, what is needed is a rear seat assembly that is stored in a folded position and that requires no floor based support. This invention meets this need and provides for the interior floor to be flat with no assemblies or apparatuses disrupting the floor space.

II. SUMMARY OF THE INVENTION

According to one embodiment, a vehicle may include a frame, at least one ground engaging wheel operatively supported to the frame, and a locomotion source that is operatively supported to the frame for providing locomotion for the vehicle. The vehicle also may include a passenger compartment that is operatively supported to the frame and that is used to support associated passengers, the passenger compartment including (1) a floor; (2) at least one front seat assembly positioned in a front portion of the passenger compartment and facing generally frontward; (3) at least one rear seat assembly positioned in a rear portion of the passenger compartment and facing generally frontward; and, (4) a bulkhead partition that extends generally upward from the frame and that defines at least a portion of a rear boundary of the passenger compartment. The vehicle may also include a cargo compartment that is operatively supported to the frame and that is used to support associated cargo, the cargo compartment including (1) a vehicle bed having a cargo receiving surface; (2) a pair of generally parallel, spaced-apart, sidewalls that extend generally upward from opposite sides of the vehicle bed; and, (3) wherein the bulkhead partition is positioned generally frontward of the cargo compartment. The rear seat assembly may include (1) a seat back and (2) a seat base that is rotatable with respect to the seat back about a substantially horizontal axis and that has a longitudinal axis. The vehicle may also include a seat base adjustment system for use in supporting and adjusting the position of the seat base, the seat base adjustment system including (1) a first channel mounted to the seat base and, (2) a first seat support member having a first end slidably engaged to the first channel and a second end pivotably attached to the bulkhead partition, wherein the seat base adjustment system is used to adjust the seat base between (1) a first storage condition where the longitudinal axis of the seat base is substantially perpendicular to the floor and, (2) a second use condition where the longitudinal axis of the seat base is substantially parallel to the floor and where the seat base is able to support an associated passenger. The vehicle may also include a release mechanism that is adjustable between (1) a first condition that prevents the seat base from rotating and (2) a second condition that permits rotation of the seat base.

One advantage of this invention is the provision of a floor with no recesses or indentations that are designed to assist with stabilizing or supporting a rear seat assembly. This allows for more useful interior storage space.

Another advantage of this invention is that it streamlines construction of the seat assembly, as it eliminates certain parts that were required in the prior art.

Yet another advantage of this invention is the robust nature of the assembly no longer requires that certain components be used. This also reduces manufacturing costs.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 2 is a side profile view of a cantilevered seat shown in the use condition according to one embodiment.

FIG. 3 is a side profile view of the cantilevered seat of FIG. 2, shown in the storage condition.

FIG. 4 is a bottom view of the cantilevered seat of FIG. 2.

FIG. 4A is the section B-B view in FIG. 4.

FIG. 5 is a side profile view of a cantilevered seat shown in the use condition according to one embodiment.

FIG. 6 is a side profile view of a cantilevered seat shown in the storage condition according to one embodiment.

FIG. 7 is a close-up view of a seat base adjustment system shown in a locked condition according to one embodiment.

FIG. 8 is a close-up view of a seat base adjustment system shown in a released condition according to one embodiment.

FIG. 9 is a close-up view of a seat base adjustment system shown in a locked condition according to one embodiment.

IV. DETAILED DESCRIPTION OF THE INVENTION

Figure 1:
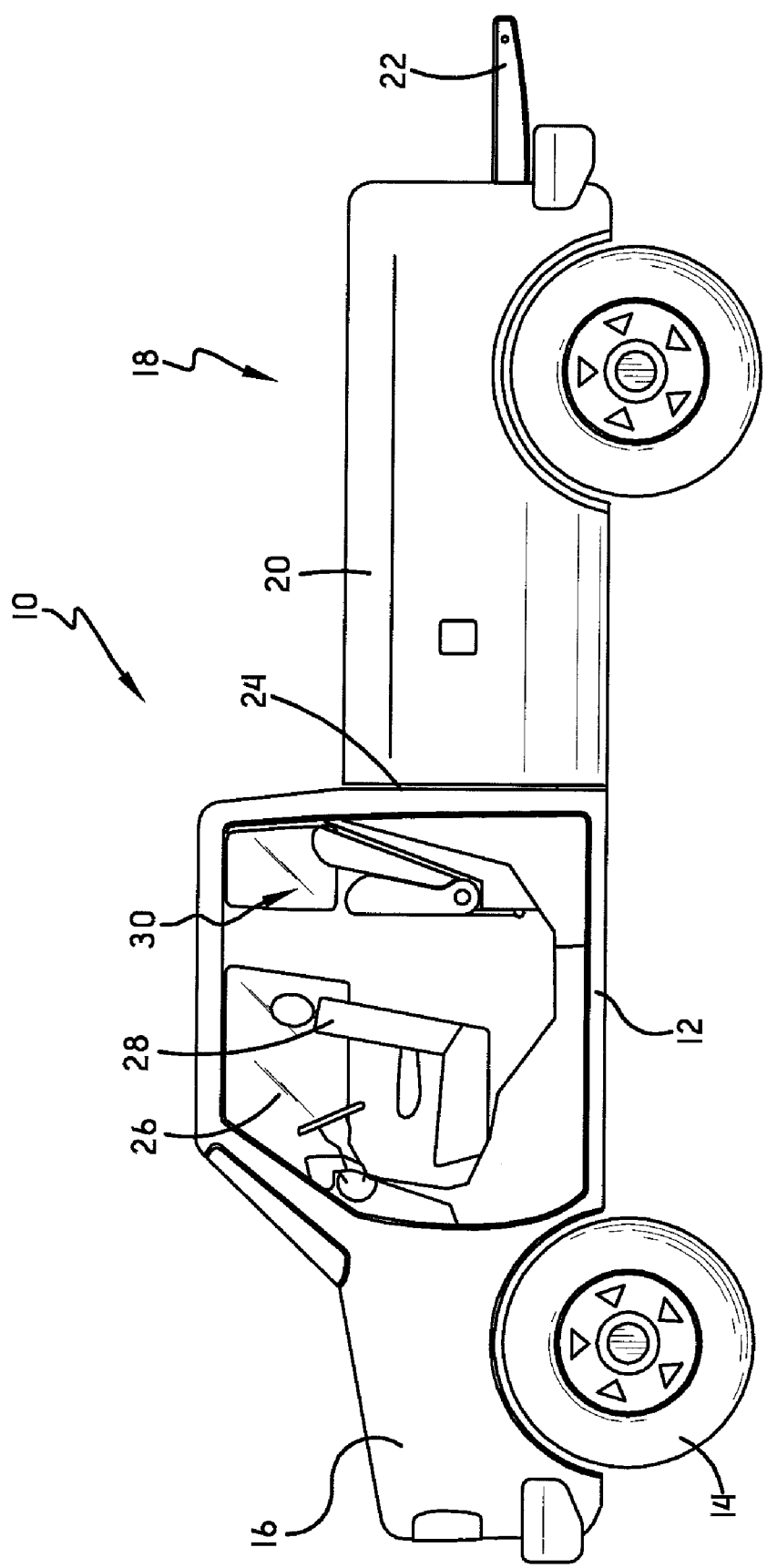
FIG. 1 is a side view of a vehicle showing the passenger compartment.

Referring now to the drawings wherein the showings are for purposes of illustrating embodiments of the invention only and not for purposes of limiting the same, FIG. 1 shows a vehicle 10 using a rear seat assembly 30 according to one embodiment of this invention. While the vehicle 10 shown is a vehicle known as a pick-up truck, it is to be understood that the rear seat assembly 30 of this invention will work with any vehicle including, for some non-limiting examples, any modern mode of transportation or vehicle, including automobiles, trucks, motorcycles, aircraft or sea-faring vessels. The vehicle 10 may include a frame 12, one or more ground engaging wheels 14 supported to the frame 12, and a locomotion source 16 supported to the frame 12 and for use in providing locomotion for the vehicle. The locomotion source could be of any type chosen with the sound judgment of a person of skill in the art including, for some non-limiting examples, an internal combustion engine (ICE), an electric motor, and so called "hybrids" which combine an ICE with an electric motor.

With continuing reference to FIG. 1, the vehicle 10 may also have a passenger compartment 26 that is supported to the frame 12 and that is used, as is well known in the art, to shelter and protect passengers while the vehicle 10 is in motion. The passenger compartment 26 may also be used for general storage. In modern vehicles, it is a design consideration to maximize the amount of storage space inside the passenger compartment 26. Additionally, the vehicle 10 may have two seating areas, a front seat assembly 28 and a rear seat assembly 30. In one embodiment, the front seat assembly 28 and the rear seat assembly 30 may face generally forward toward the front of the vehicle 10, as shown. In one embodiment, the rear seat assembly 30 may compose individual seating areas or resemble one continuous assembly spanning a length of the rear portion of the passenger compartment 26, which is commonly known as bench seating. In another embodiment, the rear seat assembly 30 may have individual seating for each passenger. The rear seat assembly 30 should not be limited to one type of seating arrangement and can be implemented in many different seating configurations. The rear bulkhead 24 extends generally upward from the frame and defines at least a portion of a rear boundary of the passenger compartment 26. The vehicle 10 also may have vehicle cargo compartment 18 with a pair of generally parallel, spaced-apart, upstanding sidewalls 20 and a tailgate 22 extending between the sidewalls 20 at the rear of the vehicle 10.

With reference now to FIGS. 2-6, the rear seat assembly 30 may include a seat back 34 and a companion seat base 40. The seat back 34 may have a front portion 36 that is designed to cushion and support an occupant in a known manner and a rear portion 38. The seat back 34 may be supported in any manner chosen with the sound judgment of a person of skill in the art. In one embodiment, the seat back 34 may be supported by direct fastening to the rear bulkhead 24 via mechanical fasteners, or in another embodiment, the seat back 34 may be pivotally attached to the rear bulkhead 24 or the seat base 40. The seat back 34 may also be able to recline at various angles that are desired by the occupant. The seat back 34 may be able to recline from 90° to 130° in relation to the seat base 40, as shown by reclining angle 70. Additionally, an actuator 35 near the base of the seat back 34 may provide the adjustable reclining angle 70.

With continuing reference to FIGS. 2-6, the seat base 40 may have a top portion 42 that is designed to cushion and support an occupant while using the rear seat assembly 30, a bottom portion 44, and a longitudinal axis A-A. The seat base 40 may pivot about a pivot axis 41 as will be discussed further below. The pivot axis 41 may be formed in any manner and connected to the vehicle 10 in any manner chosen with the sound judgment of a person of skill in the art. In one embodiment, the pivot axis 41 is defined by at least one pivot pin 43 that is received within a portion of the seat back 34. In another embodiment, the pivot pin 43 is operatively attached to the bulkhead 24. The seat base 40 may be permitted a range of motion provided by a seat base adjustment system 50. More specifically, the seat base adjustment system 50 may be used to pivot the seat base 40 about the pivot axis 41 between a storage condition or position 52, as shown in FIGS. 3 and 6, and a use condition or position 32, as shown in FIGS. 2 and 5. In the use condition 32, the longitudinal axis A-A of the seat base 40 may be nearly parallel, within 10-15 degrees, to the floor 72. In the use condition 32, the rear seat assembly 30 is able to provide a seating area for at least one rear occupant. In one embodiment, the longitudinal axis A-A of the seat base 40 is substantially parallel to the floor 72 in the use condition 32. In the storage condition 52, the longitudinal axis A-A of the seat base 40 may be nearly perpendicular, within 10-15 degrees, to the floor 72. In one embodiment, the longitudinal axis A-A of the seat base 40 is substantially perpendicular to the floor 72 in the storage condition 52.

Figure 10:
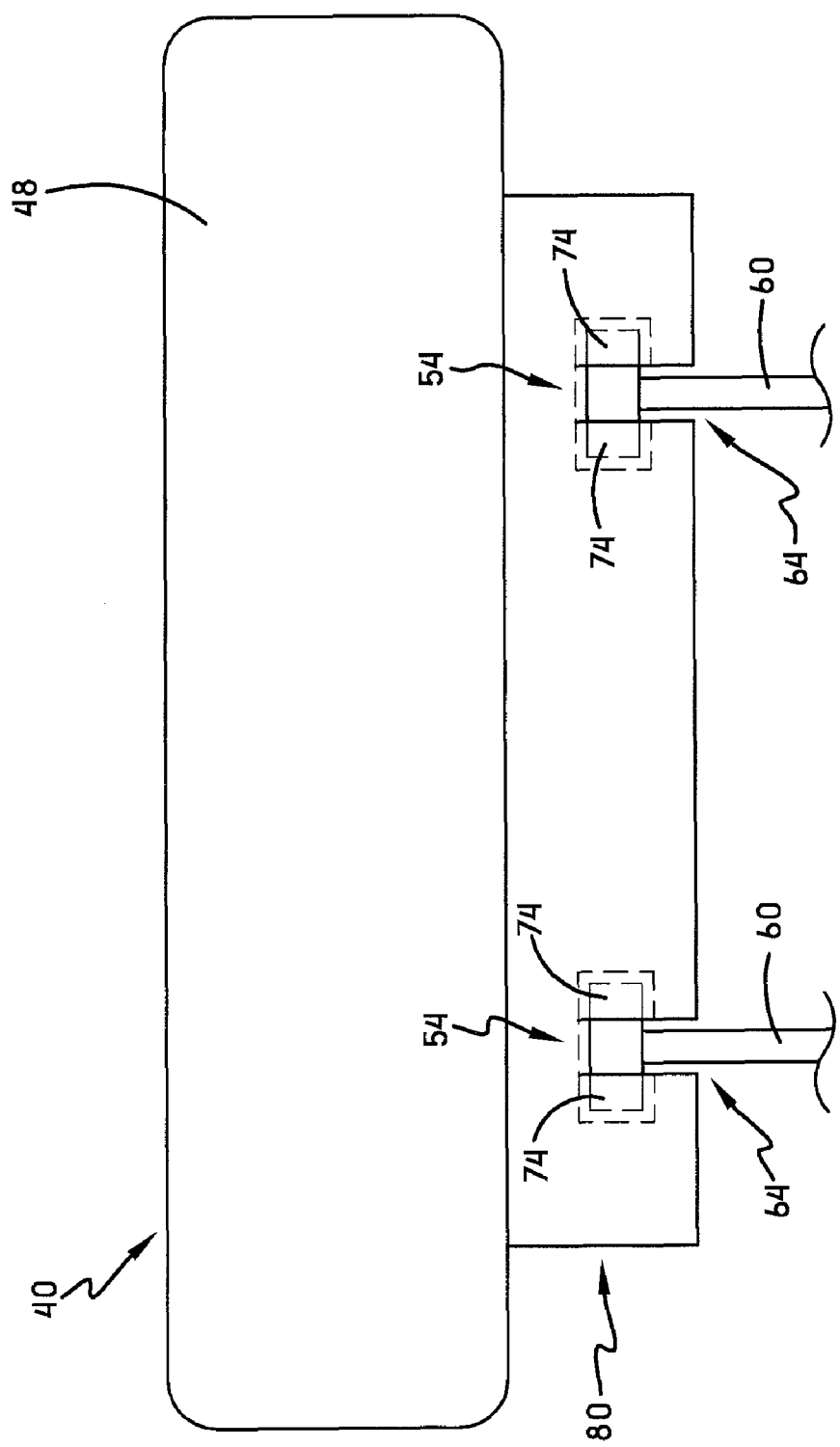
FIG. 10 is a rear view of a seat base adjustment system according to one embodiment.

With reference now to FIGS. 2-10, the seat base adjustment system 50 may include at least one channel 54 formed in or attached to the bottom portion 44 of the seat base 40 and a seat support 60. In one embodiment, the channel 54 is formed in the bottom portion 44 of the seat base 40, as shown in FIGS. 4 and 4A. In another embodiment, the channel 54 is located in a slide rail 80, as shown in FIG. 10. The slide rail 80 may be attached to the bottom portion 44 of the seat base 40 by any means or method chosen by one skilled in the art. In one embodiment, the slide rail 80 is attached to the bottom portion 44 of the seat base 40 with mechanical fasteners. Each channel 54 may span at least a portion of the length of the bottom portion 44 of the seat base 40 in the general direction of longitudinal axis A-A. A first end 56 of the channel 54 may terminate at or near the front portion 46 of the seat base 40. A second end 58 of the channel 54 may be located at or near the rear portion 48 of the seat base 40. The second end 58 of the channel 54 may have an open portion sized to receive the seat support 60 when the seat base 40 is in the storage condition 52. The channel 54 may be generally "T" shaped, with the wider portion set further in the seat base 40, as shown in FIG. 4A, or in the slide rail 80, as shown in FIG. 10. The seat support 60 may have a first end 62 pivotably attached to the rear bulkhead 24 and a second end 64 slidably attached to channel 54 of the seat base adjustment system 50. The second end 64 of the seat support 60 may be generally "T" shaped, as shown in FIGS. 4A and 10. The second end 64 of the seat support may include extensions 74, which facilitate a sliding movement along the channel 54. The extensions 74 may also maintain the second end 64 of the seat support 60 within the channel 54.

With reference now to FIGS. 5-9, the seat assembly 30 may include a release mechanism 68. The release mechanism 68 may be a release handle or lever, as is well known in the art. The release mechanism 68 operates to release or unlock the seat base adjustment system 50, which allows the seat base 40 to move between the use condition 32 and the storage condition 52. The release mechanism 68 is adjustable between a locked condition 86 that prevents the seat base 40 from rotating, as shown in FIGS. 7 and 9, and an unlocked condition 88 that permits rotation of the seat base 40, as shown in FIG. 8. The release mechanism 68 can maintain the seat assembly 30 in the locked condition 86 when the seat assembly is in the use condition 32, as shown in FIG. 7. The release mechanism 68 can also maintain the seat assembly 30 in the locked condition 86 when the seat assembly is in the storage condition 52, as shown in FIG. 9. The release mechanism 68 may include stop members 82, 84 within the slide rail 80. The stop member 82, 84 may be formed of one contiguous member or two separate members. The stop members 82, 84 may have a generally triangular or trapezoidal shape. The stop members 82, 84 may be biased in a locked condition 86, as shown in FIGS. 7 and 9. In one embodiment, the stop members 82, 84 are spring loaded to bias them in the locked condition 86. In this embodiment, the spring exerts a force on the stop members 82, 84 to remain within the channel 54 until the release handle 68 is actuated. The release handle or lever 68 may be connected to the stop members 82, 84 by a wire connection. When the release handle 68 is actuated, the stop members 82, 84 are retracted from the channel 54 in an unlocked condition 88, as shown in FIG. 8. In one embodiment, the actuation of the release handle 68 retracts the spring loaded stop members 82, 84 from the channel 54 over the bias of the spring.

With continuing reference to FIGS. 5-9, the stop members 82, 84 may engage the second end 64 of the seat support 60 in the locked condition 86. When the seat base 40 is in the use condition 32 and the release mechanism 68 is in the locked condition 86, the stop member 82 engages the second end 64 of the seat support 60 and maintains the second end 64 at or near the first end 56 of the channel 54. This maintains the seat base 40 in the use condition 32. When the seat base 40 is in the storage condition 52 and the release mechanism 68 is in the locked condition 86, the stop member 84 engages the second end 64 of the seat support 60 and maintains the second end 64 at or near the second end 58 of the channel 54. This maintains the seat base 40 in the storage condition 52. When the release mechanism 68 is in the unlocked condition 88, the second end 64 of the seat support 60 can move freely within the channel 54 in any position from the first end 56 to the second end 58 of the channel 54.

With reference now to all the FIGURES, the operation of the seat assembly 30 will now be described. To adjust the seat base 40 from the use condition 32 to the storage condition 52, the release mechanism 68 is actuated. This disengages the stop member 82 from the second end 64 of the seat support 60. The seat base 40 may then be pivoted about pivot axis 41 towards the rear bulkhead 24. The first end 64 of the seat support 60 slides in channel 54 from the first end 56 to the second end 58. The first end 62 of the seat support 60 pivots at its attachment to the rear bulkhead 24. When the second end 64 of the seat support 60 reaches the second end 58 of the channel 54, the stop member 84 engages the second end 64 of the seat support 60 to maintain the seat base 40 in the storage condition 52. To adjust the seat base 40 from the storage condition 52 back to the use condition 32, the release mechanism 68 is actuated again. This disengages the stop member 84 from the second end 64 of the seat support 60. The seat base 40 may then be pivoted about pivot axis 41 away from the rear bulkhead 24. The first end 64 of the seat support 60 slides in channel 54 from the second end 58 to the first end 56. The first end 62 of the seat support 60 pivots at its attachment to the rear bulkhead 24. When the second end 64 of the seat support 60 reaches the first end 56 of the channel 54, the stop member 82 engages the second end 64 of the seat support 60 to maintain the seat base 40 in the use condition 52.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A vehicle comprising:
    a frame;
    at least one ground engaging wheel operatively supported to the frame;
    a locomotion source that is operatively supported to the frame and that provides locomotion for the vehicle;
    a passenger compartment that is operatively supported to the frame and that is used to support associated passengers, the passenger compartment comprising: (1) a floor; (2) at least one front seat assembly positioned in a front portion of the passenger compartment and facing generally frontward; (3) at least one rear seat assembly positioned in a rear portion of the passenger compartment and facing generally frontward; and, (4) a bulkhead partition that extends generally upward from the frame and that defines at least a portion of a rear boundary of the passenger compartment;
    a cargo compartment that is operatively supported to the frame and that is used to support associated cargo, the cargo compartment comprising: (1) a vehicle bed having a cargo receiving surface; (2) a pair of generally parallel, spaced-apart, sidewalls that extend generally upward from opposite sides of the vehicle bed; and, (3) wherein the bulkhead partition is positioned generally frontward of the cargo compartment;
    wherein the rear seat assembly comprises: (1) a seat back; and, (2) a seat base that is rotatable with respect to the seat back about a substantially horizontal axis and that has a longitudinal axis;
    a seat base adjustment system for use in supporting and adjusting the position of the seat base, the seat base adjustment system comprising: (1) a first channel mounted to the seat base; and, (2) a first seat support member having a first end slidably engaged to the first channel and a second end pivotably attached to the bulkhead partition;
    wherein the seat base adjustment system is used to adjust the seat base between: (1) a first storage condition where the longitudinal axis of the seat base is substantially perpendicular to the floor; and, (2) a second use condition where the longitudinal axis of the seat base is substantially parallel to the floor and where the seat base is able to support an associated passenger; and,
    a release mechanism that is adjustable between: (1) a first locked condition that prevents the seat base from rotating; and (2) a second unlocked condition that permits rotation of the seat base.

2. The vehicle of claim 1 wherein the rear seat assembly has a second seat support member having a first end slidably engaged to a second channel and a second end pivotably attached to the bulkhead partition.

3. The vehicle of claim 1 wherein the seat back is reclinable.

4. The vehicle of claim 1 wherein the seat base spans the width of the passenger compartment.

5. The vehicle of claim 1 wherein the rear seat assembly further comprises:
    (1) a second seat back; and, (2) a second seat base that is rotatable with respect to the second seat back about a substantially horizontal axis and that has a longitudinal axis;
    a second seat base adjustment system for use in supporting and adjusting the position of the second seat base, the second seat base adjustment system comprising: (1) a first channel mounted to the second seat base; and, (2) a first seat support member having a first end slidably engaged to the first channel and a second end pivotably attached to the bulkhead partition.

6. The vehicle of claim 1 wherein the release mechanism further comprises:
a release member operatively attached to the seat base, wherein actuation of the release member adjusts the release mechanism from the first locked condition to the second unlocked condition;
a stop member for preventing the seat base from rotating in the first locked condition, the stop member operatively connected to the release member;
wherein at least a portion of the stop member is located within the first channel in the first locked condition to prevent the first end of the first seat support member from sliding within the first channel; and,
wherein at least a portion of the stop member is removed from within the first channel in the second unlocked condition to allow the first end of the first seat support member to slide within the first channel.

7. The vehicle of claim 6 wherein the stop member has a generally trapezoidal shape.

8. The vehicle of claim 6 wherein the stop member is attached to the release member by a wire.

9. The vehicle of claim 6 wherein the stop member engages the first end of the seat support member when the release mechanism is in the first locked condition and the seat base is in the first storage condition, and wherein the stop member engages the first end of the seat support member when the release mechanism is in the first locked condition and the seat base is in the second use condition.

10. The vehicle of claim 9 further comprising a second stop member, wherein the first stop member engages the first end of the seat support member when the release mechanism is in the first locked condition and the seat base is in the first storage condition, and wherein the second stop member engages the first end of the seat support member when the release mechanism is in the first locked condition and the seat base is in the second use condition.

11. The vehicle of claim 6 wherein the stop member is biased in the first locked condition.

12. The vehicle of claim 11 wherein a spring biases the stop member in the first locked condition.

13. A seat assembly for use with an associated vehicle including a frame, a locomotion source supported to the frame for providing locomotion for the vehicle, ground engaging wheel operatively supported to the frame, a passenger compartment operatively supported to the frame for supporting associated passengers, and a bulkhead partition that extends generally upward from the frame and that defines at least a portion of a rear boundary of the passenger compartment, the seat assembly comprising:
a seat back;
a seat base that is rotatable with respect to the seat back about a substantially horizontal axis and that has a longitudinal axis;
a seat base adjustment system for use in supporting and adjusting the position of the seat base, the seat base adjustment system comprising: (1) a first channel mounted to the seat base; and, (2) a first seat support member having a first end slidably engaged to the first channel and a second end pivotably attached to the bulkhead partition;
wherein the seat base adjustment system is used to adjust the seat base between: (1) a first storage condition where the longitudinal axis of the seat base is substantially perpendicular to the floor; and, (2) a second use condition where the longitudinal axis of the seat base is substantially parallel to the floor and where the seat base is able to support an associated passenger; and,
a release mechanism that is adjustable between: (1) a first locked condition that prevents the seat base from rotating; and (2) a second unlocked condition that permits rotation of the seat base.

14. The vehicle of claim 13 wherein the release mechanism further comprises:
a release member operatively attached to the seat base, wherein actuation of the release member adjusts the release mechanism from the first locked condition to the second unlocked condition;
a stop member for preventing the seat base from rotating in the first locked condition, the stop member operatively connected to the release member;
wherein at least a portion of the stop member is located within the first channel in the first locked condition to prevent the first end of the first seat support member from sliding within the first channel; and,
wherein at least a portion of the stop member is removed from within the first channel in the second unlocked condition to allow the first end of the first seat support member to slide within the first channel.

15. The vehicle of claim 14 wherein the stop member has a generally trapezoidal shape.

16. The vehicle of claim 14 wherein the stop member is attached to the release member by a wire.

17. The vehicle of claim 14 wherein the stop member engages the first end of the seat support member when the release mechanism is in the first locked condition and the seat base is in the first storage condition, and wherein the stop member engages the first end of the seat support member when the release mechanism is in the first locked condition and the seat base is in the second use condition.

18. The vehicle of claim 17 further comprising a second stop member, wherein the first stop member engages the first end of the seat support member when the release mechanism is in the first locked condition and the seat base is in the first storage condition, and wherein the second stop member engages the first end of the seat support member when the release mechanism is in the first locked condition and the seat base is in the second use condition.

19. The vehicle of claim 14 wherein the stop member is biased in the first locked condition.

20. The vehicle of claim 19 wherein a spring biases the stop member in the first locked condition.

* * * * *